(12) United States Patent
Tahk

(10) Patent No.: US 11,104,458 B2
(45) Date of Patent: Aug. 31, 2021

(54) CUBESAT SPACE DEPLOYER

(71) Applicants: SpaceBey Inc., Seoul (KR); SaTReC (Satellite Technology Research Center), Daejeon (KR)

(72) Inventor: Gyungmo Tahk, Seoul (KR)

(73) Assignees: SpaceBey Inc., Seoul (KR); SaTReC (Satellite Technology Research Center), Daejeon (KR)

( * ) Notice: Subject to any disclaimer, the term of this patent is extended or adjusted under 35 U.S.C. 154(b) by 348 days.

(21) Appl. No.: 16/242,758

(22) Filed: Jan. 8, 2019

(65) Prior Publication Data

US 2019/0210745 A1    Jul. 11, 2019

(30) Foreign Application Priority Data

Jan. 8, 2018    (KR) .......................... 10-2018-0002322

(51) Int. Cl.
*B64G 1/64*    (2006.01)
*B64G 1/10*    (2006.01)

(52) U.S. Cl.
CPC .............. *B64G 1/641* (2013.01); *B64G 1/10* (2013.01)

(58) Field of Classification Search
CPC . B64G 1/10; B64G 1/641; B64G 1/22; B64G 1/222; B64G 1/645; E05Y 2201/40; E05Y 2900/531; F16C 2208/66
See application file for complete search history.

(56) References Cited

U.S. PATENT DOCUMENTS

| | | | | | |
|---|---|---|---|---|---|
| 4,771,971 | A | * | 9/1988 | Ludwig ................. | B64G 1/641 165/104.33 |
| 5,050,821 | A | * | 9/1991 | Kerstein ................. | B64G 1/22 244/173.1 |
| 5,462,800 | A | * | 10/1995 | Yamazaki ............. | C04B 41/009 428/408 |
| 5,743,492 | A | * | 4/1998 | Chan ........................ | B64F 1/04 102/274 |
| 5,755,406 | A | * | 5/1998 | Aston .................. | B64G 1/1007 244/159.4 |
| 5,755,407 | A | * | 5/1998 | Aubret .................... | B64G 1/641 244/137.4 |
| 5,848,766 | A | * | 12/1998 | Thompson ............... | B64G 1/14 244/173.1 |
| 6,126,115 | A | * | 10/2000 | Carrier .................... | B64G 1/641 244/137.4 |
| 6,227,493 | B1 | * | 5/2001 | Holemans ............... | B64G 1/641 244/173.1 |
| 6,357,699 | B1 | * | 3/2002 | Edberg ................... | B64G 1/641 102/377 |
| 6,869,048 | B2 | * | 3/2005 | Draisey ................... | B64G 1/242 244/158.1 |
| 6,905,097 | B2 | * | 6/2005 | Blackwell-Thompson ................. | B64G 1/14 244/173.1 |

(Continued)

FOREIGN PATENT DOCUMENTS

JP    2010-105497 A    5/2010
JP    2011-251560 A    12/2011

*Primary Examiner* — Medhat Badawi
(74) *Attorney, Agent, or Firm* — Studebaker & Brackett PC

(57) ABSTRACT

The present invention relates to a cubesat space deployer, and more particularly, to a cubesat space deployer for separating an ultra-small satellite (cubesat) from a launch vehicle in a space orbit while protecting the ultra-small satellite from a launch environment.

7 Claims, 16 Drawing Sheets

(56) References Cited

U.S. PATENT DOCUMENTS

| | | | |
|---|---|---|---|
| 9,434,486 B1* | 9/2016 | Santos | B64G 1/64 |
| 9,796,488 B2* | 10/2017 | Cook | B64G 1/641 |
| 10,011,373 B1* | 7/2018 | Echelman | F16B 7/0406 |
| 10,017,279 B2* | 7/2018 | Poncet | B64G 1/1085 |
| 10,053,243 B2* | 8/2018 | Apland | B64G 1/641 |
| 10,689,133 B2* | 6/2020 | Cheynet de Beaupre | B64G 1/26 |
| 10,773,831 B2* | 9/2020 | Wang | B64G 1/244 |
| 10,850,866 B2* | 12/2020 | Fisher | B64F 1/005 |
| 2003/0192522 A1* | 10/2003 | Taryoto | A63B 67/18 124/78 |
| 2005/0045771 A1* | 3/2005 | Caldwell | B64G 1/641 244/137.4 |
| 2005/0230562 A1* | 10/2005 | Buehler | B64G 1/645 244/173.1 |
| 2006/0049317 A1* | 3/2006 | Reutenauer | B64G 1/222 244/172.9 |
| 2012/0112010 A1* | 5/2012 | Young | B64G 1/641 244/173.1 |
| 2012/0280085 A1* | 11/2012 | Sinclair | B64D 1/12 244/137.3 |
| 2013/0099059 A1* | 4/2013 | Cheynet De Beaupre | B64G 1/10 244/158.1 |
| 2014/0117028 A1* | 5/2014 | Huber | B29C 70/52 220/600 |
| 2014/0131521 A1* | 5/2014 | Apland | B64G 1/641 244/173.3 |
| 2014/0319283 A1* | 10/2014 | Holemans | B64G 1/641 244/173.3 |
| 2016/0075452 A1* | 3/2016 | Robles | B64G 1/641 244/173.3 |
| 2017/0072647 A1* | 3/2017 | Perrillat | B29C 70/462 |
| 2017/0081011 A1* | 3/2017 | Matthews | B64D 1/02 |
| 2017/0174368 A1* | 6/2017 | Dube | B64G 1/641 |
| 2017/0225873 A1* | 8/2017 | Fougere | B65D 83/0418 |
| 2017/0320597 A1* | 11/2017 | Lim | B64G 1/641 |
| 2017/0327253 A1* | 11/2017 | Bogdanov | B64G 1/645 |
| 2018/0194494 A1* | 7/2018 | Dube | B64G 1/645 |
| 2019/0039754 A1* | 2/2019 | Beck | B60P 7/16 |
| 2019/0039755 A1* | 2/2019 | Beck | B60P 7/135 |
| 2019/0039756 A1* | 2/2019 | Beck | B60P 7/16 |
| 2019/0039757 A1* | 2/2019 | Beck | B64G 1/22 |
| 2019/0168606 A1* | 6/2019 | Faber | B60K 15/03 |
| 2019/0210745 A1* | 7/2019 | Tahk | B64G 1/641 |

\* cited by examiner

… (1)

CUBESAT SPACE DEPLOYER

BACKGROUND OF THE INVENTION

1. Field of the Invention

The present invention relates to a cubesat space deployer, and more particularly, to a cubesat space deployer for separating an ultra-small satellite (cubesat) from a launch vehicle in a space orbit while protecting the ultra-small satellite from a launch environment.

2. Description of the Related Art

An ultra-small satellite is referred to as 'cubesat', which performs tasks such as earth observation and space data collection. The cubesat is being developed for research in universities, government agencies, corporations, or the like, and is rapidly and extensively applied for commercial use over the world.

The cubesat is standardized to have a cube shape in which width/length/height are respectively 10 cm (which is referred to as '1 U size') and to weigh about 1 kg. The cubesat with the 1 U size, which is a basic size, may expand its size by an integer multiple such as 2 U or 3 U, and a 3 U-size cubesat (10 cm×10 cm×30 cm) is used the most.

Such a cubesat is mounted inside a deployer so as to be fixed to a launch vehicle, and the deployer provides functions to protect the cubesat from threats that occur in a launch environment, such as vibrations or shocks, and to separate the cubesat from the launch vehicle in a space orbit to deploy the cubesat into a satellite orbit.

In addition, since the functions of the cubesat are gradually advanced, it is necessary to inspect an operation state of the cubesat after the cubesat is assembled into the launch vehicle, and there is an increasing need for a communication connection device for the inspection.

SUMMARY OF THE INVENTION

An object of the present invention is to provide a cubesat space deployer for separating an ultra-small satellite (cubesat) from a launch vehicle in a space orbit while protecting the ultra-small satellite from a launch environment.

To achieve the objects described above, according to the present invention, there is provided a cubesat deployer including: a container unit accommodated therein with a cubesat to protect the cubesat; an opening/closing unit for opening/closing an outlet through which the cubesat enters and exits; and a spring unit for applying a force to the cubesat to push the cubesat when the cubesat is separated, wherein the spring unit includes at least one first deployer coupling part coupled to a first cubesat coupling member provided on the cubesat to fix the cubesat when the cubesat is accommodated in the cubesat deployer.

According to the present invention, the first cubesat coupling member may be a protrusion, and the first deployer coupling part may be a protrusion coupling groove corresponding to a protrusion shape of the first cubesat coupling member.

According to the present invention, the opening/closing unit may include at least one second deployer coupling part coupled to a second cubesat coupling member provided on the cubesat to fix the cubesat when the cubesat is accommodated in the cubesat deployer.

According to the present invention, the spring unit may further include: a satellite connection part making contact with the cubesat to transmit the force to the cubesat when the cubesat is separated; a main spring member for supplying the force to the satellite connection part when the cubesat is separated; and a satellite connection part fixing member coupled to the satellite connection part to adjust positions of the satellite connection part and the container unit when the cubesat is accommodated in the deployer.

According to the present invention, the satellite connection part fixing member may be a rod formed on one side thereof with a screw thread or a thread groove.

According to the present invention, the container unit may be formed with a satellite connection part adjustment member in a form of a through-hole to allow a user to manipulate the satellite connection part fixing member to adjust the positions at which the satellite connection part and the container unit are fixed when the opening/closing unit is closed.

According to the present invention, the container unit may include a container rear part having at least one spring unit coupling member, which is provided in a form of a groove and is formed at an inner side of the container unit where the cubesat is accommodated, an opposite side of the satellite connection part fixing member on which the screw thread or the thread groove is not formed may be accommodated in the spring unit coupling member, one side of the satellite connection part may be formed with the first deployer coupling part, an opposite side of the satellite connection part may be formed with at least one leg member formed therein with a through-hole, and a screw thread or a thread groove corresponding to the screw thread or the thread groove of the satellite connection part fixing member may be formed at an inner surface of the through-hole of the leg member.

According to the present invention, the cubesat deployer may further include a satellite guidance member disposed at an inner side of the container unit to guide the cubesat to move in a direction of the outlet.

According to the present invention, the satellite guidance member may have a shape of a guide rail to guide the cubesat by making line contact with the cubesat.

According to the present invention, the cubesat deployer may further include a communication connection unit disposed at an outer side of the container unit to make communication connection to allow the cubesat to communicate with an external computing device while the cubesat is accommodated in the container unit.

According to the present invention, the communication connection unit may include a connection port corresponding to a communication device of the accommodated cubesat.

According to the present invention, the cubesat deployer may further include an opening/closing unit fixing unit for fixing the opening/closing unit to prevent the opening/closing unit from being closed again when the opening/closing unit is opened.

According to one embodiment of the present invention, the cubesat accommodated in the cubesat deployer is coupled to the cubesat deployer by a protrusion-groove type fixing device to prevent the cubesat from deviating by vibrations in the launch environment, so that malfunctions can be prevented from occurring.

According to one embodiment of the present invention, the satellite connection part of the cubesat deployer, which makes direct contact with the cubesat, is fixed to the container unit by the satellite connection part fixing member to prevent abnormal vibrations of the cubesat from occurring, so that the malfunctions can be prevented from occurring.

According to one embodiment of the present invention, the satellite connection part fixing member is manipulated through the satellite connection part adjustment member when the opening/closing unit is closed, so that the position at which the satellite connection part is fixed can be adjusted.

According to one embodiment of the present invention, the satellite guidance member guides the cubesat accommodated in the cubesat deployer in the direction of the outlet, so that the cubesat is prevented from being damaged when the cubesat is separated.

According to one embodiment of the present invention, communication is made through the communication connection unit while the cubesat is accommodated in the cubesat deployer, so that the operation state of the cubesat can be inspected while the cubesat is assembled to the launch vehicle.

According to one embodiment of the present invention, when the opening/closing unit is opened to allow the cubesat to be separated, the opening/closing unit fixing unit can prevent the opening/closing unit from being closed again so as to collide with the cubesat, so that the cubesat can be prevented from being damaged.

According to one embodiment of the present invention, when the opening/closing unit is opened to allow the cubesat to be separated, the opening/closing protection member can prevent the cubesat from colliding with the opening/closing unit and being damaged.

DETAILED DESCRIPTION OF THE INVENTION

In the following, various embodiments and/or aspects are now described with reference to the drawings. In the following description, for purposes of explanation, numerous specific details are set forth in order to provide a thorough understanding of one or more aspects. However, it will also be appreciated by those of ordinary skill in the art that such aspect(s) may be practiced without the specific details. The following description and the appended drawings describe certain illustrative aspects of one or more aspects. It is to be understood, however, that such aspects are illustrative, some of various methods according to principles of the various aspects may be employed, and the description set forth is intended to include all such aspects and their equivalents.

The terms used herein such as "embodiment", "example", "aspect", and "for example" indicate that any described aspects or designs may not be construed as being better or advantageous over other aspects or designs.

In addition, the term "or" is intended to mean inclusive "or", not exclusive "or". In other words, unless otherwise specified or if unclear in context, the expression "X uses A or B" is intended to mean one of the natural inclusive substitutions. In other words, when X uses A; X uses B; or X uses both A and B, the expression "X uses A or B" can be applied to either of these cases. It is also to be understood that the term "and/or" used herein refers to and includes all possible combinations of one or more of the listed related items.

In addition, the terms "comprises" and/or "comprising" indicate the presence of corresponding features and/or elements, but do not exclude the presence or addition of one or more other features, components, and/or groups thereof.

In addition, although any of the terms including ordinal numbers such as "first" or "second" may be used herein to describe various elements, the elements should not be limited by the terms. The terms are only used to distinguish one element from another. For example, a first element could be termed as a second element, and, similarly, a second element could be termed as a first element, without departing from the scope of the present invention. The term "and/or" includes any combination of a plurality of disclosed items related thereto, or one of a plurality of disclosed items related thereto.

In addition, in embodiments of the present invention, unless otherwise defined, all terms including technical terms and scientific terms used herein have the same meaning as how they are generally understood by those of ordinary skill in the art to which the invention pertains. Any terms that are defined in a general dictionary shall be construed to have the same meaning in the context of the relevant art, and, unless otherwise defined explicitly in the embodiments of the present invention, shall not be interpreted to have an idealistic or excessively formalistic meaning.

Figure 1A:
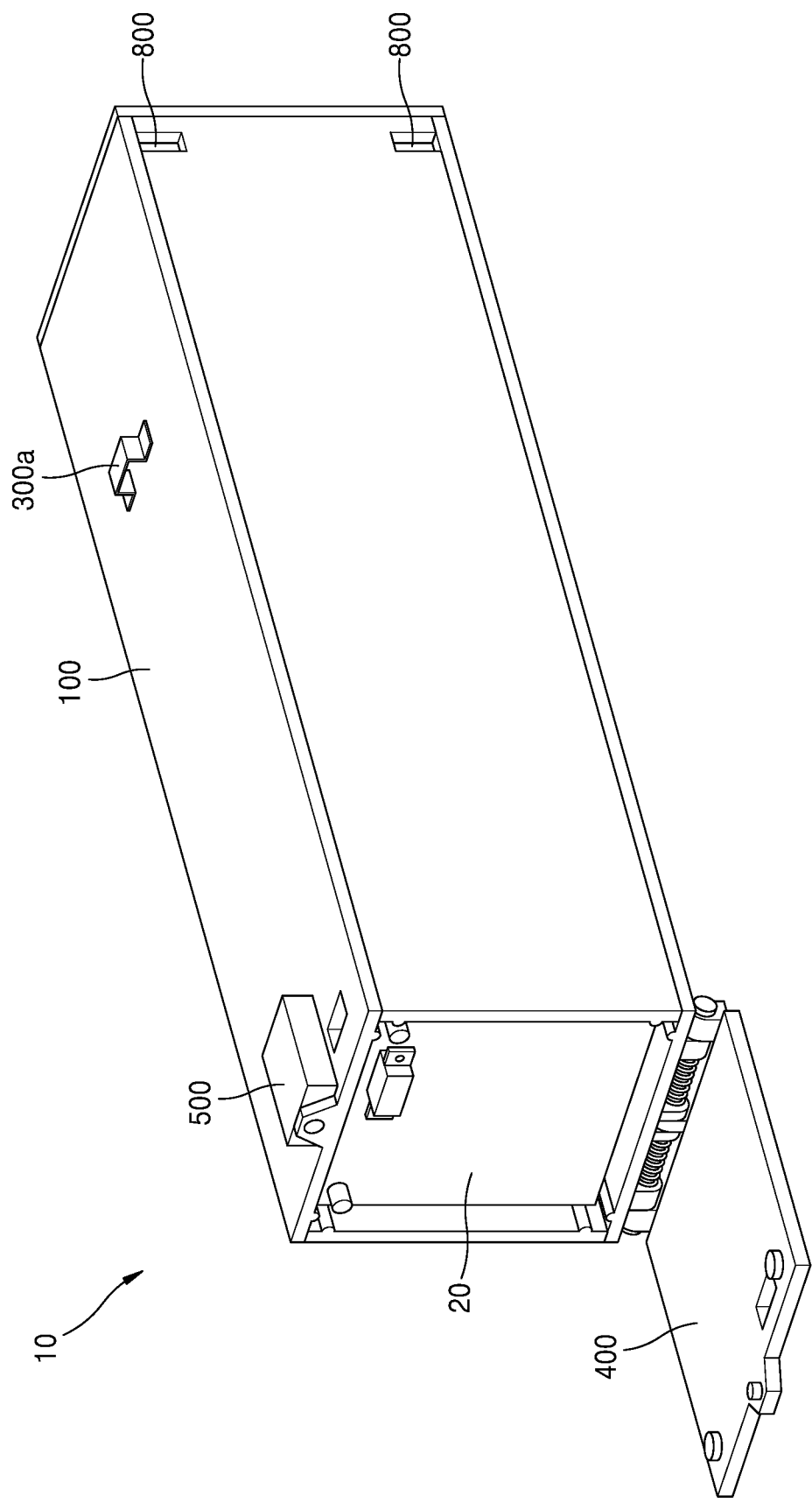
FIGS. 1A and 1B are perspective views schematically showing a cubesat deployer according to one embodiment of the present invention.
Figure 1B:
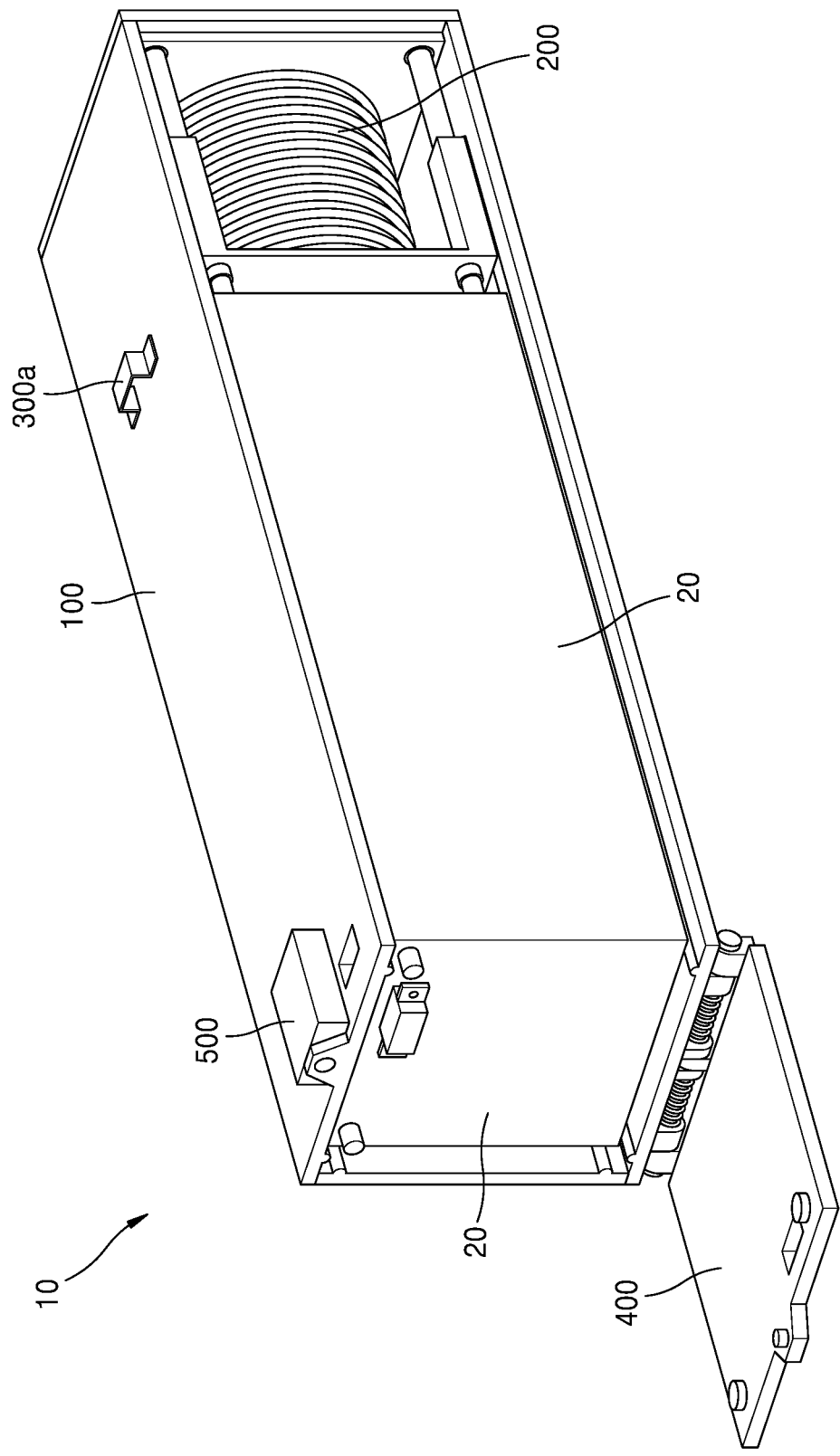

FIGS. 1A and 1B are perspective views schematically showing a cubesat deployer according to one embodiment of the present invention.

Referring to FIGS. 1A and 1B, according to one embodiment of the present invention, a cubesat deployer 10 may include a container unit 100, a spring unit 200, a communication connection unit 300.a, an opening/closing unit 400, an opening/closing driving unit 500, and a satellite connection part adjustment member 800.

FIG. 1A is a perspective view schematically showing the cubesat deployer 10 according to one embodiment of the present invention, and FIG. 1B is a perspective view schematically showing a state in which a side panel of the container unit 100 of the cubesat deployer 10 is removed.

The container unit 100 may be accommodated therein with a cubesat 20 to protect the cubesat 20. The container unit 100 allows the cubesat 20 to be fixedly accommodated in the container unit 100 according to a standard of the cubesat 20. FIGS. 1A and 1B show the container unit 100 in which the cubesat 20 of a 3 U size may be accommodated.

The spring unit 200 applies a force to the cubesat 20 to push the cubesat 20 when the cubesat 20 is separated. The spring unit 200 is positioned between the cubesat 20 and the container unit 100 to push the cubesat 20 in a direction of an outlet of the container unit 100. Due to such an operation of the spring unit 200, the cubesat 20 is separated and deployed from the cubesat deployer 10 installed in a launch vehicle in a space, so that the cubesat 20 may be seated in a satellite orbit.

The communication connection unit 300.a is provided at an outer side of the cubesat deployer 10 to make communication with the cubesat 20 while the cubesat 200 is accommodated in the cubesat deployer 10. The communication connection unit 300.a makes communication with the cubesat 20 when the cubesat 20 is coupled to an inner side of the cubesat deployer 10 assembled to the launch vehicle, so that an operating state of the cubesat 20 may be inspected.

According to one embodiment of the present invention, the communication connection unit 300.a may include a connection port corresponding to a communication device of the accommodated cubesat 20. Alternatively, the communication connection unit 300.a may include a perforation part to connect a communication cable or the like to the communication device of the cubesat 20.

The opening/closing unit 400 opens and closes the outlet through which the cubesat 20 enters and exits. As shown in FIGS. 1A and 1B, the cubesat 20 may be inserted and withdrawn in a longitudinal direction of the container unit 100. To this end, one longitudinal end of the container unit 100 is formed with the outlet, and the opening/closing unit 400 opens and closes the outlet.

According to one embodiment of the present invention, one end of the outlet of the container unit 100 and one end of the opening/closing unit 400 are connected to each other by a hinge, so that the opening/closing unit 400 may open and close the outlet by rotational movement about the hinge.

The opening/closing driving unit 500 controls the opening/closing of the opening/closing unit 400. According to one embodiment of the present invention, an opening/closing fixing pin may be provided at an opposite side of a position where the opening/closing unit 400 is connected to the container unit 100 by the hinge, and a fixing release unit may be provided to fix the opening/closing pin when the opening/closing unit 400 is in a closed state so as to fixedly close the opening/closing unit 400 and release a fixed state of the opening/closing unit 400.

Figure 7:
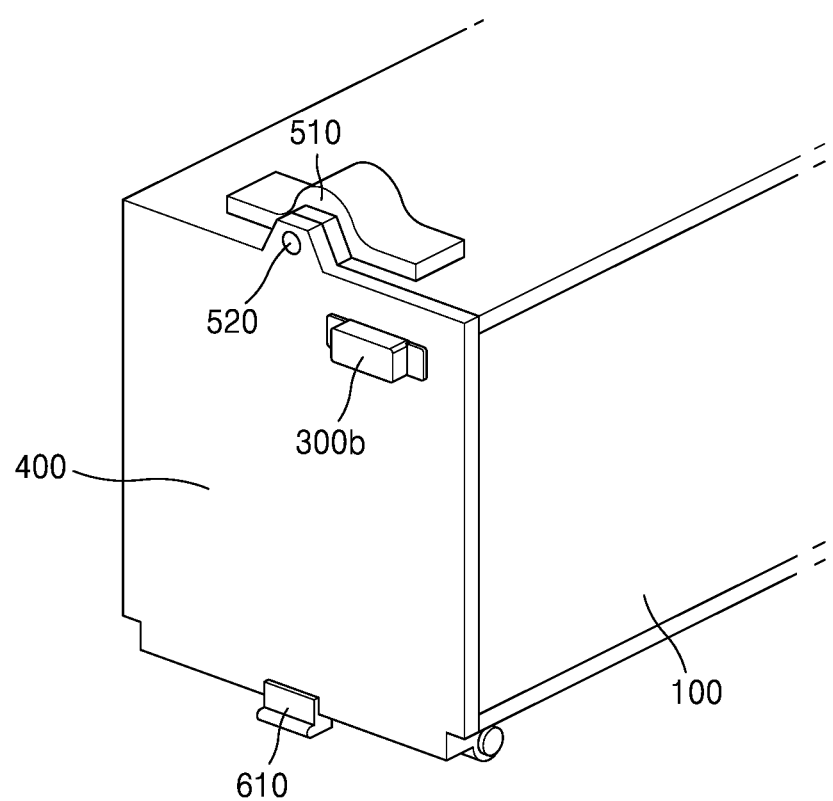
FIG. 7 is a perspective view schematically showing an opening/closing unit and an opening/closing driving unit of the cubesat deployer according to one embodiment of the present invention.
Figure 8:
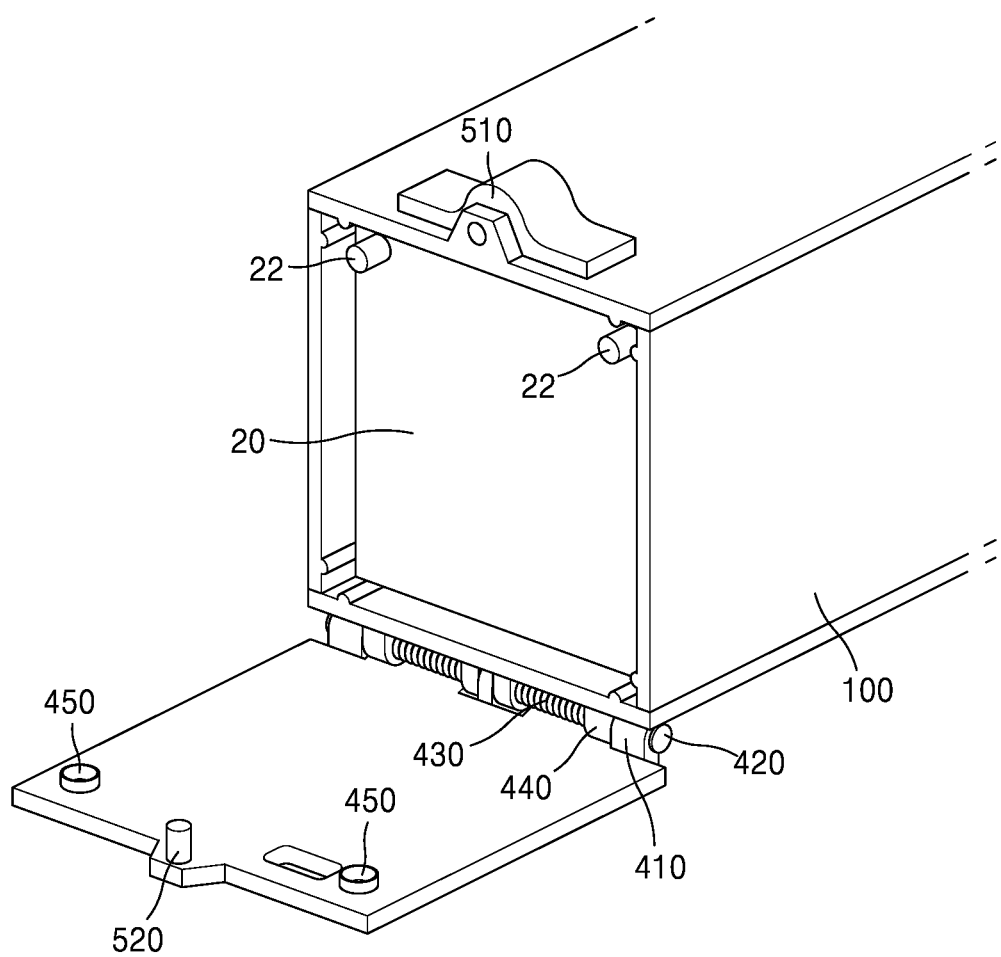
FIG. 8 is a perspective view schematically showing the opening/closing unit and the opening/closing driving unit of the cubesat deployer according to one embodiment of the present invention.

The fixing release unit may be implemented as a non-explosive fixing release unit or an explosive fixing release unit. The non-explosive fixing release unit may be implemented in the form of releasing the fixed state by applying heat to beeswax or a shape memory alloy to cause deformation, or may be implemented in the form of an opening/closing motor 510 as shown in FIG. 7 or FIG. 8. The explosive fixing release unit corresponds to a scheme of detonating gunpowder to perform the release. Both the non-explosive fixing release unit and the explosive fixing release unit may release the opening/closing unit 400 by allowing the fixing pin to deviate from an original fixing position by explosion, deformation, and movement.

Figure 2A:
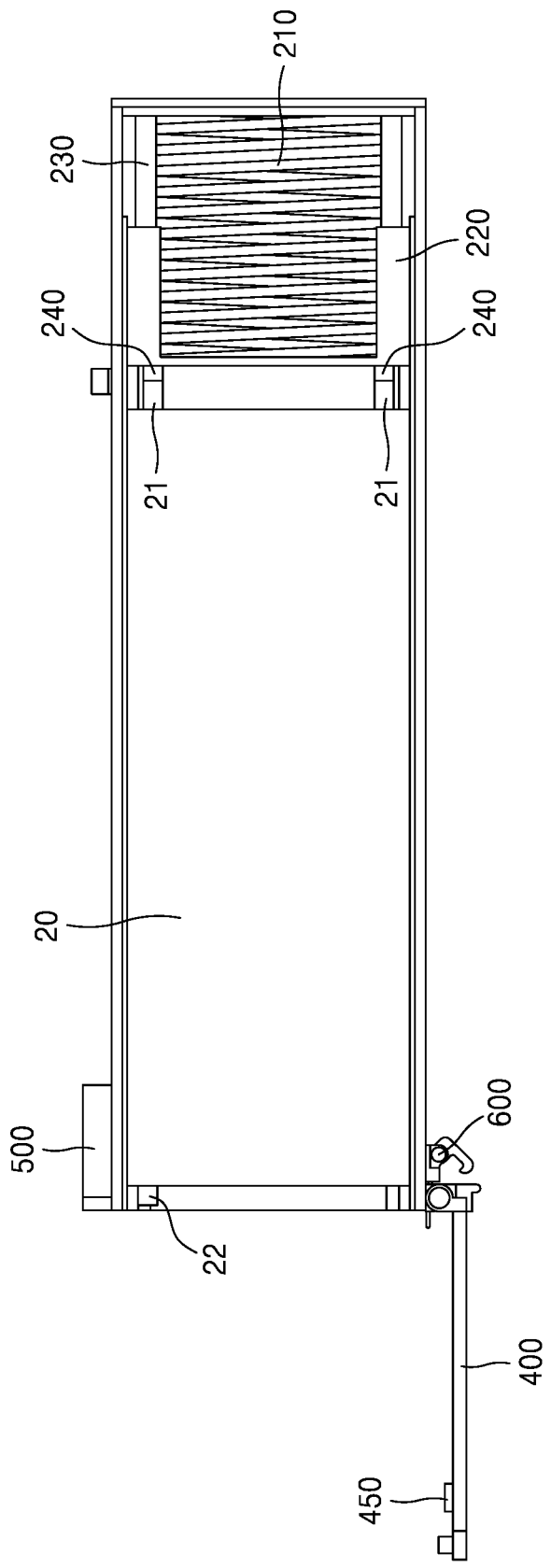
FIGS. 2A and 2B are side views schematically showing the cubesat deployer according to one embodiment of the present invention.
Figure 2B:
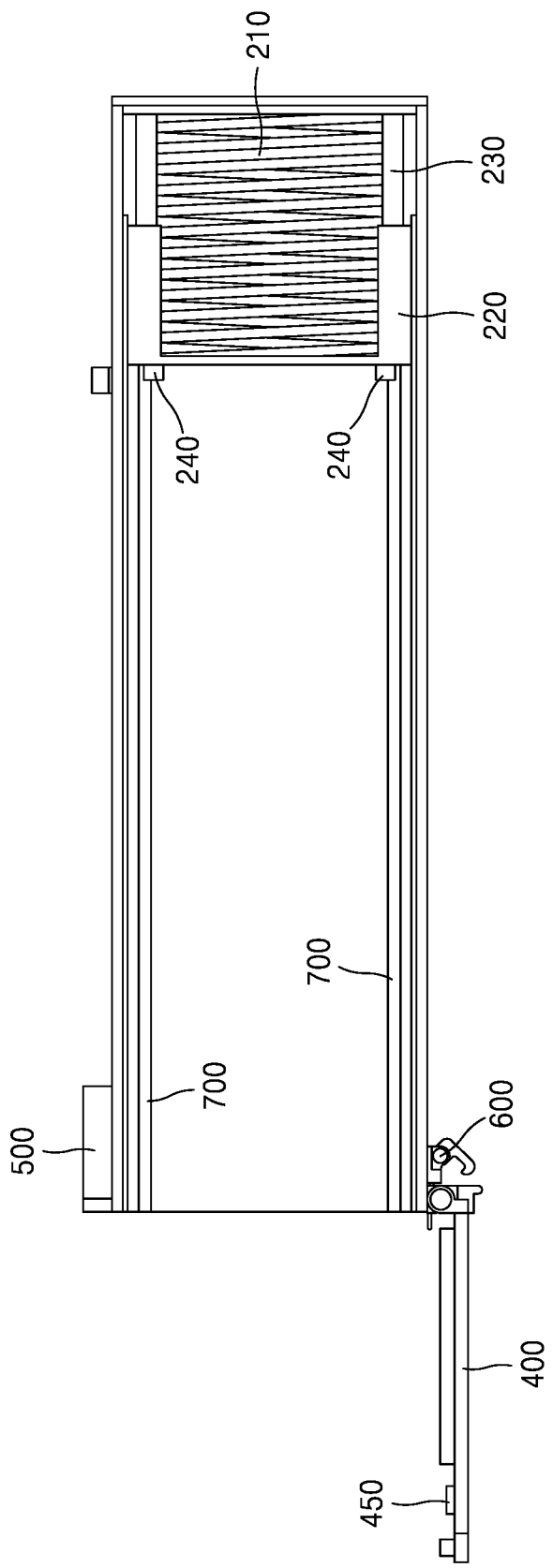

FIGS. 2A and 2B are side views schematically showing the cubesat deployer according to one embodiment of the present invention.

FIG. 2A schematically shows a state in which the cubesat 20 is coupled to the inner side of the cubesat deployer 10 according to one embodiment of the present invention, and FIG. 2B schematically shows the cubesat deployer 10 according to one embodiment of the present invention.

Referring to FIGS. 2A and 2B, according to one embodiment of the present invention, the opening/closing unit 400 may include at least one protrusion coupling groove coupled to a second cubesat coupling member 22 provided in the cubesat 20 to fix the cubesat 20 when the cubesat 20 is accommodated in the cubesat deployer 10. The protrusion coupling groove may be formed at a second deployer coupling part 450 so as to be coupled to the second cubesat coupling member 22.

As shown in FIGS. 2A and 2B, the opening/closing unit 400 is coupled to the container unit 100 through the hinge, and may rotate about the hinge to open/close the outlet of the container unit 100. The second deployer coupling part 450 of the opening/closing unit 400 is coupled to the second cubesat coupling member 22 of the cubesat 20 accommodated in the cubesat deployer 10 when the opening/closing unit 400 closes the outlet so as to prevent the cubesat 20 from deviating from a predetermined internal position, so that the cubesat 20 may be prevented from being damaged by vibrations or the like generated when the launch vehicle is launched.

Referring to FIGS. 2A and 2B, according to one embodiment of the present invention, the opening/closing unit 400 may include at least one protrusion coupling groove coupled to a first cubesat coupling member 21 provided in the cubesat 20 to fix the cubesat 20 when the cubesat 20 is accommodated in the cubesat deployer 10. The protrusion coupling groove may be formed at a first deployer coupling part 240 so as to be coupled to the first cubesat coupling member 21. As described above, the first deployer coupling part 240 is coupled with the first cubesat coupling member 21 of the cubesat 20 so as to prevent the cubesat 20 from deviating from a predetermined internal position, so that the cubesat 20 may be prevented from being damaged by the vibrations or the like generated when the launch vehicle is launched.

In addition, referring to FIGS. 2A and 2B, according to one embodiment of the present invention, a satellite connection part 220 of the spring unit 200 is connected to the cubesat 20 through the first deployer coupling part 240, and the satellite connection part 220 is fixed to the container unit 100 by a satellite connection part fixing member 230, so that the cubesat 20 is fixed to an inner side of the container unit 100.

Figure 3:
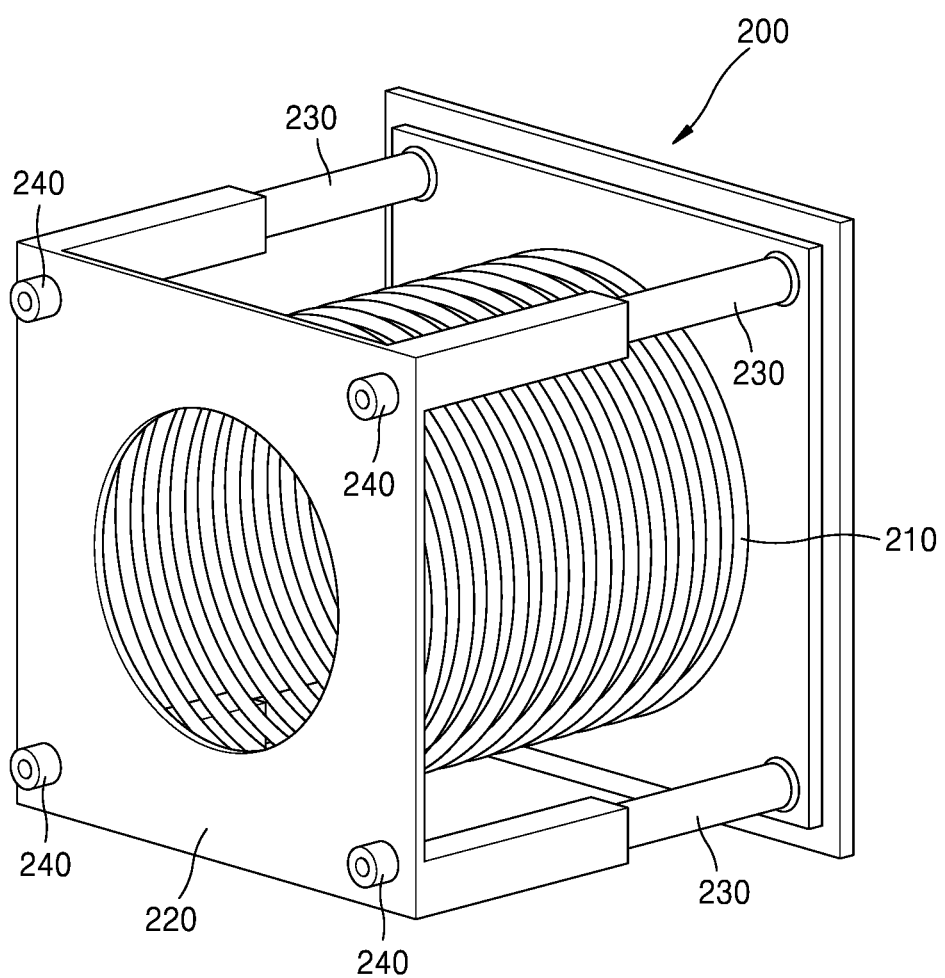
FIG. 3 is a perspective view schematically showing a spring unit of the cubesat deployer according to one embodiment of the present invention.
Figure 4:
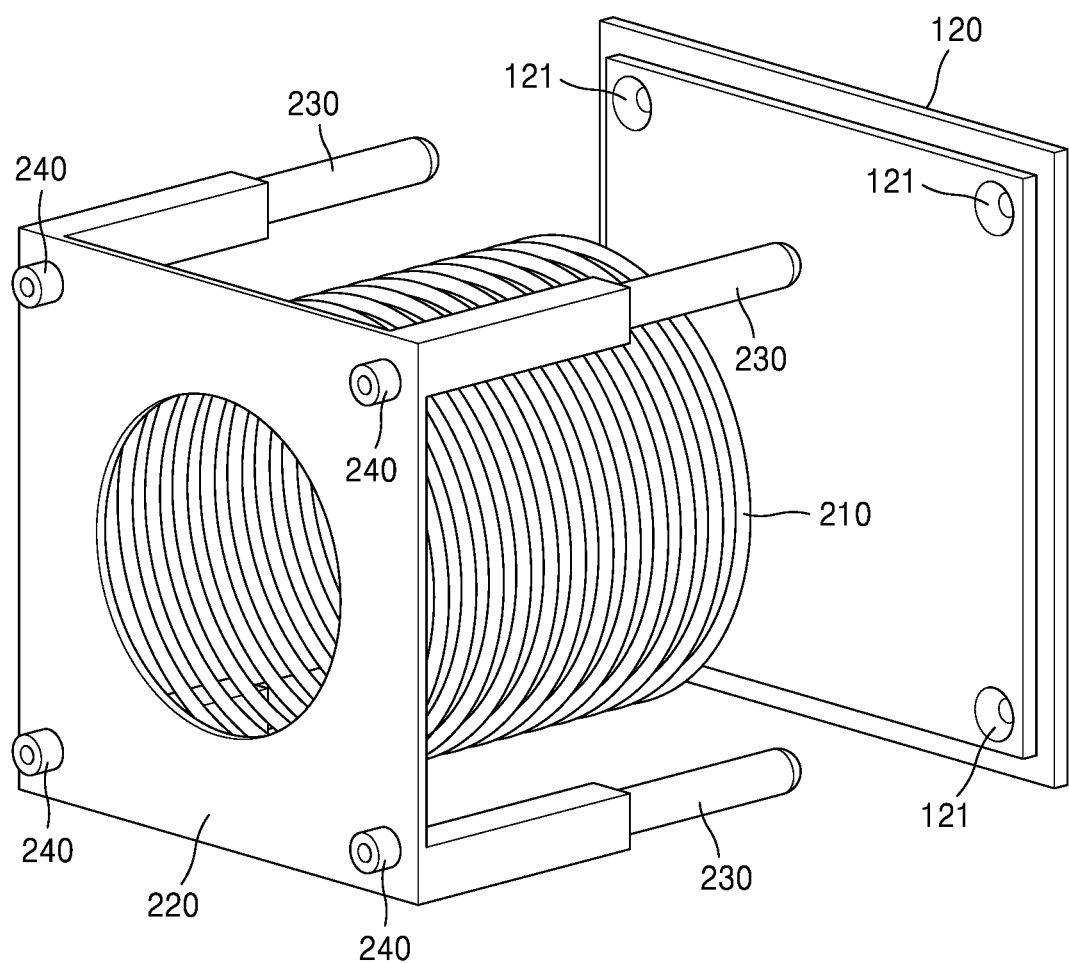
FIG. 4 is a perspective view schematically showing the spring unit of the cubesat deployer according to one embodiment of the present invention.

FIGS. 3 and 4 are perspective views schematically showing the spring unit of the cubesat deployer according to one embodiment of the present invention.

Referring to FIGS. 3 and 4, according to one embodiment of the present invention, the spring unit 200 includes a main spring member 210, the satellite connection part 220, the satellite connection part fixing member 230, and the first deployer coupling part 240.

The satellite connection part 220 makes contact with the cubesat 20 to transmit a force to the cubesat 20 when the cubesat 20 is separated.

The main spring member 210 applies a force to the satellite connection part 220 when the cubesat 20 is separated. According to one embodiment of the present invention, the main spring member 210 includes at least one compression spring and is inserted between the satellite connection part 220 and the container unit 100 to supply the force to the satellite connection part 220. Preferably, the main spring member 210 is inserted between the satellite connection part 220 and a container rear part 120 to apply the force for pushing the satellite connection part 220 from the container rear part 120.

The satellite connection part fixing member 230 may be coupled to the satellite connection part 220 to fix the satellite connection part 220 and the container unit 100 when the cubesat 20 is accommodated in the deployer 10. Since the satellite connection part 220 makes contact with the container unit 100 through the main spring member 210, the satellite connection part 220 may be vulnerable to abnormal vibrations of the main spring member 210 caused by vibrations or shocks in the launch environment. In order to prevent the abnormal vibrations from being generated, the satellite connection part 220 and the container unit 100 are fixed through the satellite connection part fixing unit 230.

According to one embodiment of the present invention, the satellite connection part fixing member 230 has a shape of a bar extending from the satellite connection part 220 to the container rear part 120, and the satellite connection part fixing member 230 makes direct contact with the container rear part 120, so that the satellite connection part 220 may be fixed so as to maintain a predetermined distance from the container rear part 120. In this case, the container rear part 120 includes a spring unit coupling member 121 to which the satellite connection part fixing member 230 is coupled, so that the satellite connection part 220 may be coupled to a predetermined position.

According to one embodiment of the present invention, the satellite connection part fixing member 230 may adjust positions where the satellite connection part 220 and the container unit 100 are fixed. The cubesat 20 is manufactured in a standardized size so as to be fixed at a predetermined position when the cubesat 20 is fixed to the inner side of the container unit 100. However, in a case where there is a manufacturing error in size for each cubesat 20, or a cubesat 20 that is out of the standard is mounted, the position of the satellite connection part 220 needs to be adjusted. To this end, in one embodiment of the present invention, the satellite connection part fixing member 230 is manipulated, so that the position at which the satellite connection part 220 is fixed may be adjusted.

According to one embodiment of the present invention, the satellite connection part fixing member 230 is formed in a shape of a rod formed on one side thereof with a screw thread or a thread groove to adjust the positions of the satellite connection part 220 and the container unit 100 through rotation. The satellite connection part fixing member 230 is formed in a shape of the rod formed on one side thereof with the screw thread or the thread groove, the satellite connection part 220 is formed with at least one leg member formed therein with a through-hole, and a screw thread or a thread groove corresponding to the screw thread or the thread groove of the satellite connection part fixing member is formed at an inner surface of the through-hole of the leg member, so that a length of the satellite connection part fixing member 230 extending from the satellite connection part 220 may be adjusted by rotating the satellite connection part fixing member 230. As described above, the length of the satellite connection part fixing member 230 may be adjusted to adjust the position at which the satellite connection part 220 is fixed from the container rear part 120.

According to another embodiment of the present invention which is not depicted in FIG. 4, the satellite connection part fixing member 230 is formed in a shape of a rod formed on one side thereof with a screw thread or a thread groove to adjust the positions of the satellite connection part 220 and the container unit 100 through rotation. The satellite connection part fixing member 230 is formed in a shape of the rod formed on one side thereof with the screw thread or the thread groove, the satellite connection part 220 is formed with at least one adjusting member formed therein with a through-hole, and a screw thread or a thread groove corresponding to the screw thread or the thread groove of the satellite connection part fixing member is formed at an inner surface of the through-hole of the adjusting member, so that a length of the satellite connection part fixing member 230 extending from the satellite connection part 220 may be adjusted by rotating the satellite connection part fixing member 230. The container rear part 120 is formed with a connection part adjustment member (which is similar to the satellite connection part adjustment member 800) which has a through-hole from outside. A person can rotate the satellite connection part fixing member 230 by inserting a tool from the through-hole of the connection part adjustment member of the container rear part 120 in order to adjust the position or length of the satellite connection part fixing member 230.

The first deployer coupling part 240 is formed with the at least one protrusion coupling groove. The protrusion coupling groove may be coupled with the first cubesat coupling member 21 of the cubesat 20. According to one embodiment of the present invention, the first deployer coupling part 240 includes four protrusion coupling grooves on a surface of the satellite connection part 220 which is connected to the cubesat 20 so as to be coupled with the cubesat.

As described above, the first deployer coupling part 240 is coupled with the first cubesat coupling member 21 of the cubesat 20 so as to prevent the cubesat 20 from deviating from a predetermined internal position, so that the cubesat 20 may be prevented from being damaged by the vibrations or the like generated when the launch vehicle is launched.

Figure 5:
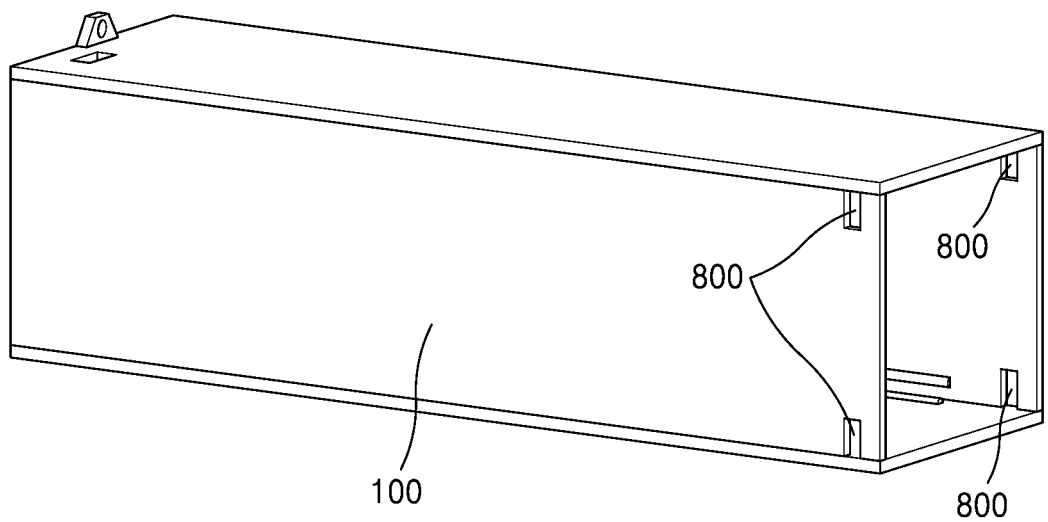
FIG. 5 is a perspective view schematically showing a container unit and a satellite connection part adjustment member of the cubesat deployer according to one embodiment of the present invention.

FIG. 5 is a perspective view schematically showing a container unit and a satellite connection part adjustment member of the cubesat deployer according to one embodiment of the present invention.

Referring to FIG. 5, according to one embodiment of the present invention, the cubesat deployer 10 includes a satellite connection part adjustment member 800.

The satellite connection part adjustment member 800 may manipulate the satellite connection part fixing member 230 to adjust a position at which the satellite connection part 220 and the container unit 100 are fixed when the opening/closing unit 400 is closed. According to one embodiment of the present invention, the satellite connection part adjustment member 800 may be provided in the form of a through-hole formed at one side of the container unit 100, so that the satellite connection part fixing member 230 may be manipulated through the through-hole.

According to one embodiment of the present invention, the satellite connection part fixing member 230 may have a shape of a rod formed on one side thereof with a screw thread or a thread groove to adjust the position at which the satellite connection part 220 is fixed by rotating the satellite connection part fixing member 230, and the satellite connection part adjustment member 800 may include a perforation part formed on one side of the container unit 100 to adjust the position of the satellite connection part 220 by rotating the satellite connection part fixing member 230.

Figure 6:
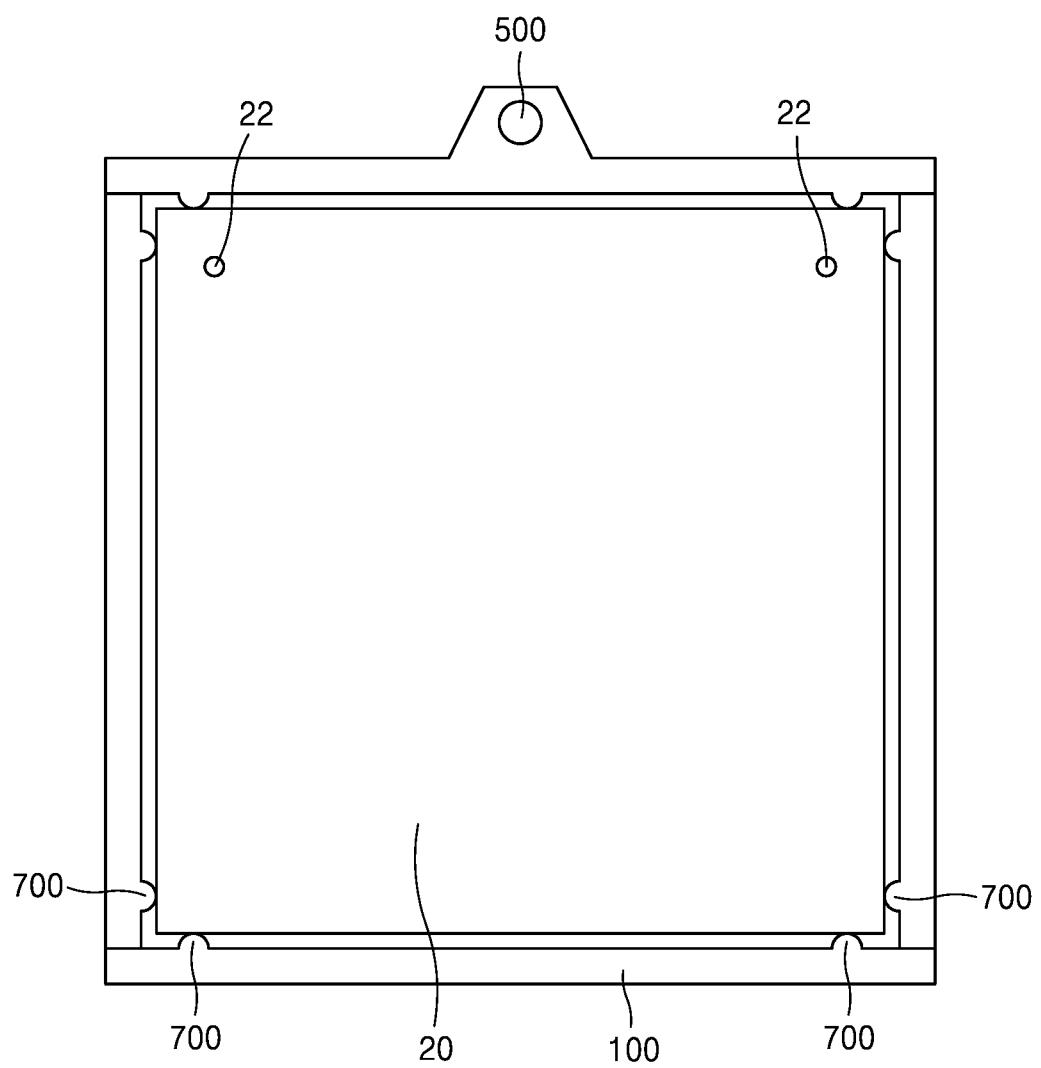
FIG. 6 is a front view schematically showing a satellite guidance member of the cubesat deployer according to one embodiment of the present invention.

FIG. 6 is a front view schematically showing a satellite guidance member of the cubesat deployer according to one embodiment of the present invention.

Referring to FIG. 6, according to one embodiment of the present invention, the cubesat deployer 10 includes the container unit 100 accommodated therein with the cubesat 20, and a satellite guidance member 700 formed at the inner side of the container unit 100 to guide the cubesat 20 in the direction of the outlet.

The satellite guidance member 700 is disposed between the cubesat 20 and the container unit 100 to prevent the cubesat 20 from being damaged by colliding with the container unit 100 or failing to be separated in a process in which the cubesat 20 deviates and is separated from the container unit 100.

In this case, according to one embodiment of the present invention, the satellite guidance member 700 has a shape of a guide rail to guide the cubesat 20 by making line contact with the cubesat 20. As described above, when the cubesat 20 makes the line contact to move in the direction of the outlet along the guide rail so as to be separated, only a predetermined part of the cubesat 20 may make contact with the guide rail. To this end, a device that allows the cubesat 20 to easily slide and move on the guide rail may be provided on the cubesat 20 at a portion making contact with the satellite guidance member 700.

FIGS. 7 and 8 are perspective views schematically showing the opening/closing unit and the opening/closing driving unit of the cubesat deployer according to one embodiment of the present invention.

Referring to FIGS. 7 and 8, according to one embodiment of the present invention, the opening/closing unit 400 of the cubesat deployer 10 includes a first opening/closing hinge knuckle 410, an opening/closing hinge pin 420, an opening/closing spring 430, a second opening/closing hinge knuckle 440, and a second deployer coupling part 450, and the opening/closing driving unit 500 includes an opening/closing motor 510 and an opening/closing fixing pin 520.

The opening/closing hinge pin 420 passes through and is coupled to the first opening/closing hinge knuckle 410 and the second opening/closing hinge knuckle 440, such that the first opening/closing hinge knuckle 410 and the second opening/closing hinge knuckle 440 are rotatably coupled to the opening/closing hinge pin 420.

The first opening/closing hinge knuckle 410 is provided on the opening/closing unit 400 so as to be coupled with the opening/closing hinge pin 420.

The second opening/closing hinge knuckle 440 is provided on the container unit 100 so as to be coupled with the opening/closing hinge pin 420. In this case, the second opening/closing hinge knuckle 440 is provided at one end of the outlet of the container unit 100 so as to be coupled with the opening/closing unit 400 provided with the first opening/closing hinge knuckle 410 through the opening/closing hinge pin 420, and the opening/closing unit 400 may open and close the outlet of the container unit 100 through rotational movement about the opening/closing hinge pin 420.

The opening/closing spring 430 is coupled to the opening/closing hinge pin 420 so as to supply torque in a direction in which the opening/closing unit 400 opens the outlet of the container unit 100 about the opening/closing hinge pin 420. As described above, when the opening/closing unit 400 is released from a fixedly closed state by the opening/closing driving unit 500 through supplying the torque by the opening/closing spring 430, the opening/closing unit 400 moves in the direction in which the outlet of the container unit 100 is opened.

The second deployer coupling part 450 is provided with a protrusion coupling groove coupled with the second cubesat coupling member 22 of the cubesat 20 to fix the cubesat 20 when the opening/closing unit 400 is in a closed state.

The opening/closing motor 510 fixedly closes the opening/closing unit 400 by fixing the opening/closing fixing pin 520 when the opening/closing unit 400 is in a closed state, and the opening/closing fixing pin 520 is coupled to the opening/closing unit 400, so that the opening/closing motor 510 may fix the opening/closing fixing pin 520 to fix the opening/closing unit 400.

Referring to FIG. 7, according to one embodiment of the present invention, a communication connection unit 300.*b* may be provided in the opening/closing unit 400. The communication connection unit 300.*b* has the same configuration as the communication connection unit 300.*a* described in FIGS. 1A and 1B, and has the same function as the communication connection unit 300.*a*. However, the communication connection unit 300.*b* may be provided on the opening/closing unit 400 instead of being provided on the container unit 100 as shown in FIGS. 1A and 1B.

Figure 9A:
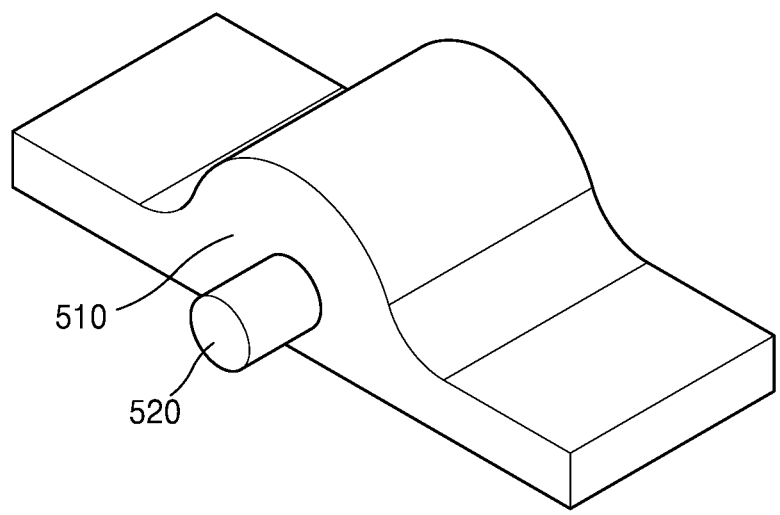
FIGS. 9A and 9B are perspective views schematically showing the opening/closing driving unit of the cubesat deployer according to one embodiment of the present invention.
Figure 9B:
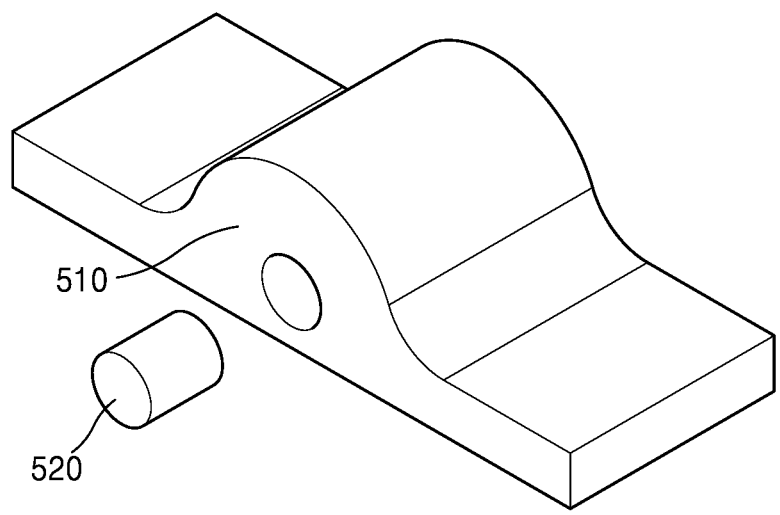

FIGS. 9A and 9B are perspective views schematically showing the opening/closing driving unit of the cubesat deployer according to one embodiment of the present invention.

FIG. 9A is a perspective view schematically showing a state in which the opening/closing driving unit 500 is in a closing operation according to one embodiment of the present invention, and FIG. 9B is a perspective view schematically showing a state in which the opening/closing driving unit 500 is in an opening operation according to one embodiment of the present invention.

Referring to FIGS. 9A and 9B, according to one embodiment of the present invention, the opening/closing driving unit 500 includes the opening/closing motor 510 and the opening/closing fixing pin 520.

The opening/closing driving unit 500 controls the opening/closing of the opening/closing unit 400.

To this end, the opening/closing motor 510 fixes the opening/closing fixing pin 520 when the opening/closing unit 400 is in a closed state so as to fixedly close the opening/closing unit 400.

The opening/closing fixing pin 520 is coupled to the opening/closing unit 400, so that the opening/closing motor 510 may fix the opening/closing unit 400 by fixing the opening/closing fixing pin 520.

The opening/closing motor 510 receives a separation signal of the cubesat 20 from an outside to release a fixed state of the opening/closing unit 400 by pushing the opening/closing fixing pin 520. In this case, the opening/closing unit 400 is opened by the opening/closing spring 430 of the opening/closing unit 400, and the cubesat 20 accommodated in the container unit 100 is separated through the opened outlet.

Figure 10:
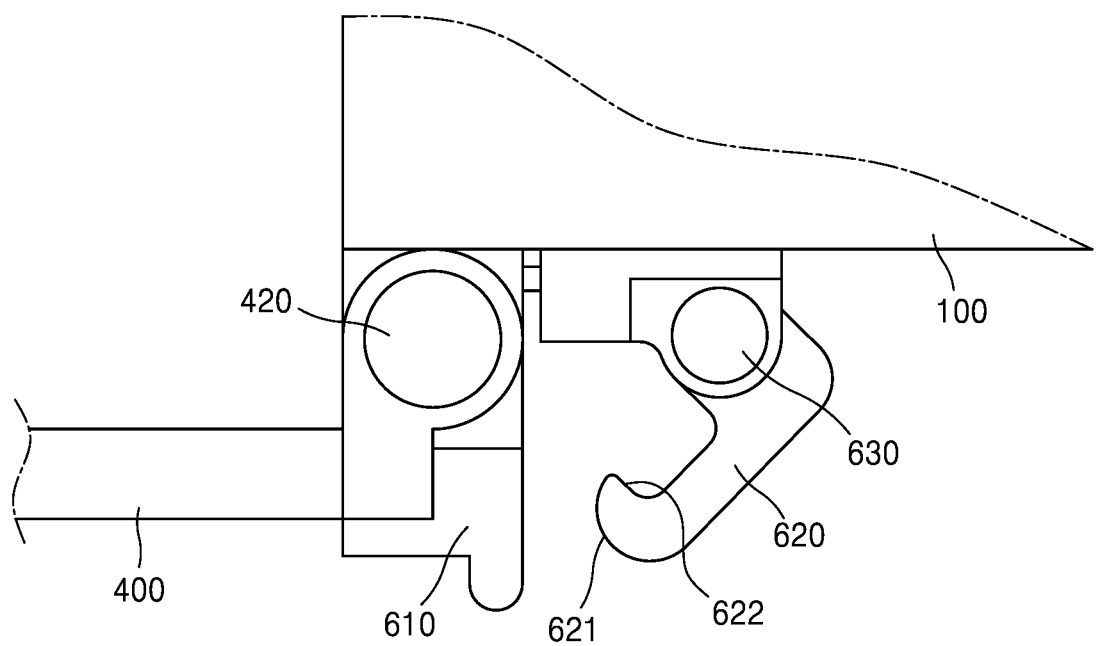
FIG. 10 is a side view schematically showing an opening/closing unit fixing unit of the cubesat deployer according to one embodiment of the present invention.
Figure 11:
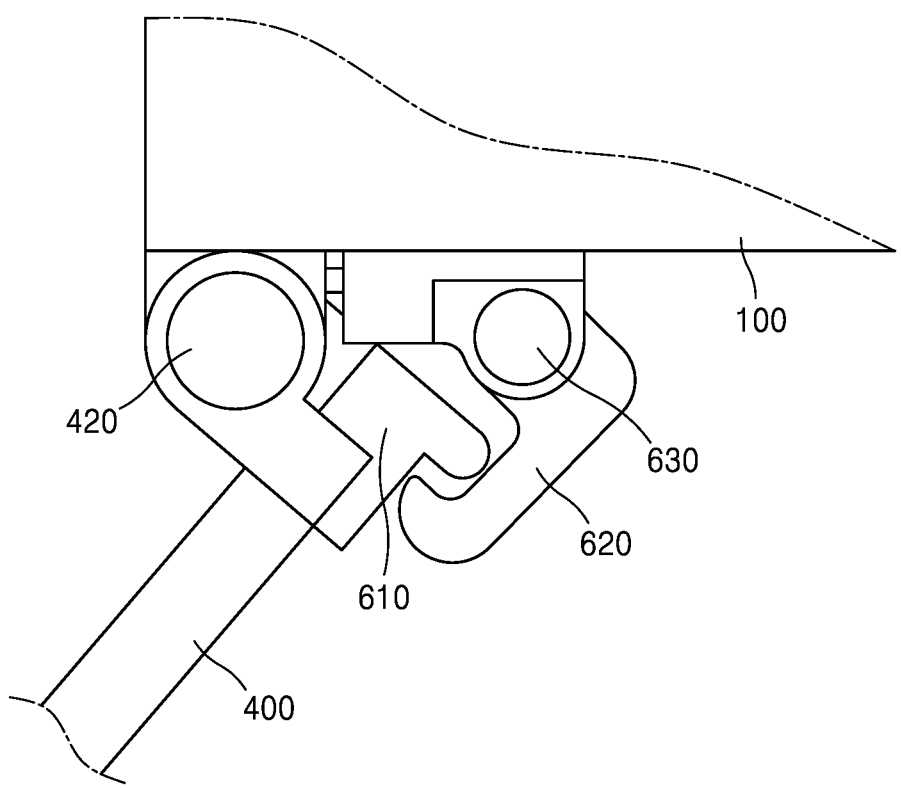
FIG. 11 is a side view schematically showing the opening/closing unit fixing unit of the cubesat deployer according to one embodiment of the present invention.

FIGS. 10 and 11 are side views schematically showing an opening/closing unit fixing unit of the cubesat deployer according to one embodiment of the present invention.

FIG. 10 schematically shows an opening/closing unit fixing unit 600 according to one embodiment of the present invention, and FIG. 11 schematically shows a state in which the opening/closing unit fixing unit 600 fixes the opening/closing unit 400 according to one embodiment of the present invention.

Referring to FIGS. 10 and 11, according to one embodiment of the present invention, the opening/closing unit fixing unit 600 fixes the opening/closing unit 400 to prevent the opening/closing unit 400 from being closed again when the opening/closing unit 400 is opened. To this end, the opening/closing unit fixing unit 600 may include a fixedly latching sill 610, a fixedly latching hook 620, and a fixedly latching hook pin 630.

The fixedly latching sill 610 is coupled with the opening/closing unit 400. The fixedly latching sill 610 is coupled to the fixedly latching hook 620.

The fixedly latching hook 620 has a shape of a latching hook that may be coupled to a sill portion of the fixedly latching sill 610. When the fixedly latching sill 610 rotates about the opening/closing hinge pin 420 of the opening/closing unit 400 and enters the fixedly latching hook 620 in a coupling direction (counterclockwise direction), the fixedly latching sill 610 may easily enter through an inclined surface 621. However, when the fixedly latching sill 610 proceeds in a separation direction (clockwise direction) after entering the fixedly latching hook 620, the sill portion of the fixedly latching sill 610 is latched on a latching surface 622 so as not to be separated. As described above, the fixedly latching sill 610 is prevented from deviating after entering, so that the opening/closing unit 400 is prevented from being closed again after being opened, and the cubesat 20 is prevented from being damaged by the opening/closing unit 400 which is to be closed.

According to one embodiment of the present invention, the fixedly latching hook 620 may be coupled to the container unit 100 through the fixedly latching hook pin 630. In this case, the fixedly latching hook 620 may be rotated through the fixedly latching hook pin 630 so that the fixedly latching sill 610 may easily enter the fixedly latching hook 620 in the coupling direction. Preferably, in this case, a spring device is mounted in the fixedly latching hook pin 630 so that the fixedly latching hook 620 may receive the torque in a clockwise direction about the fixedly latching hook pin 630 so as to allow the fixedly latching hook 620 to fix the fixedly latching sill 610.

Figure 12A:
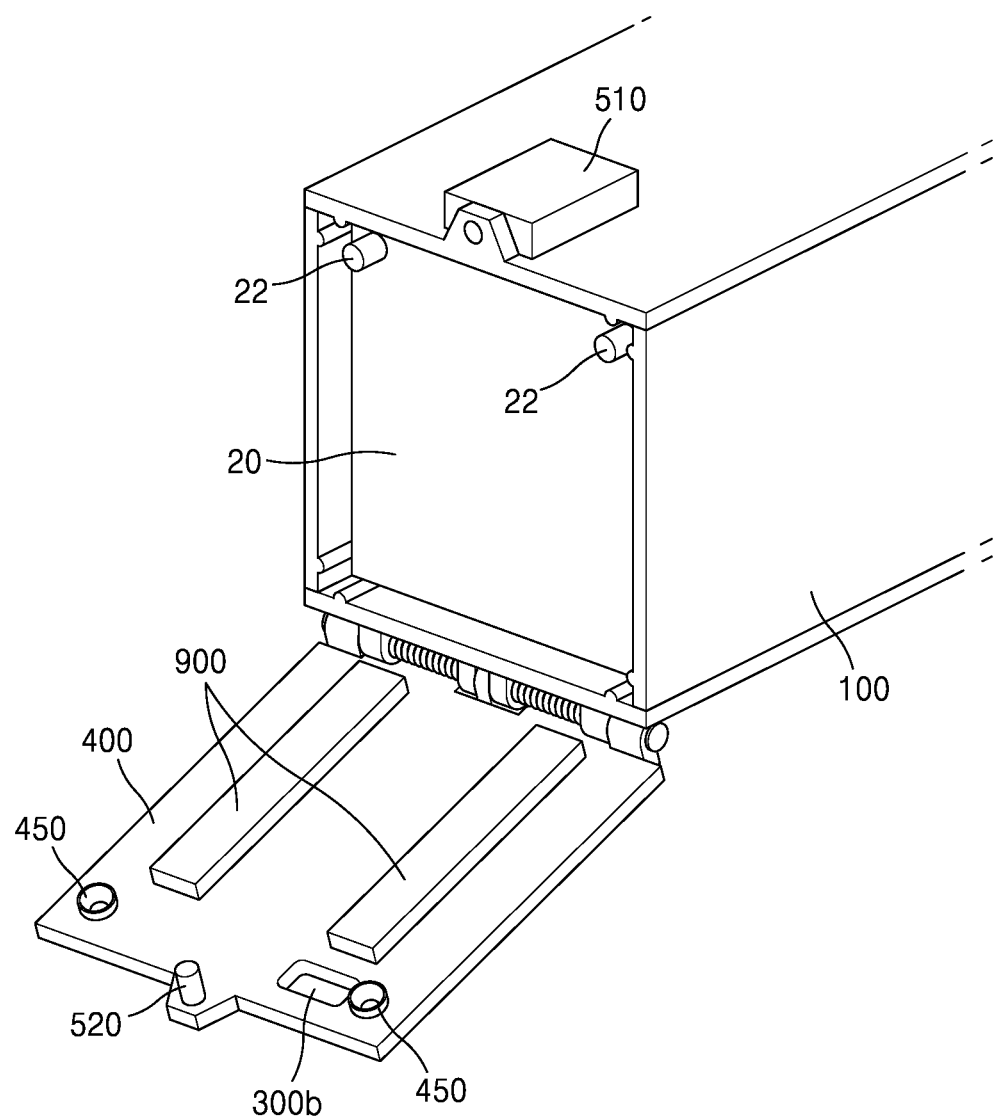
FIGS. 12A and 12B are views schematically showing an opening/closing protection member of the cubesat deployer according to one embodiment of the present invention.
Figure 12B:
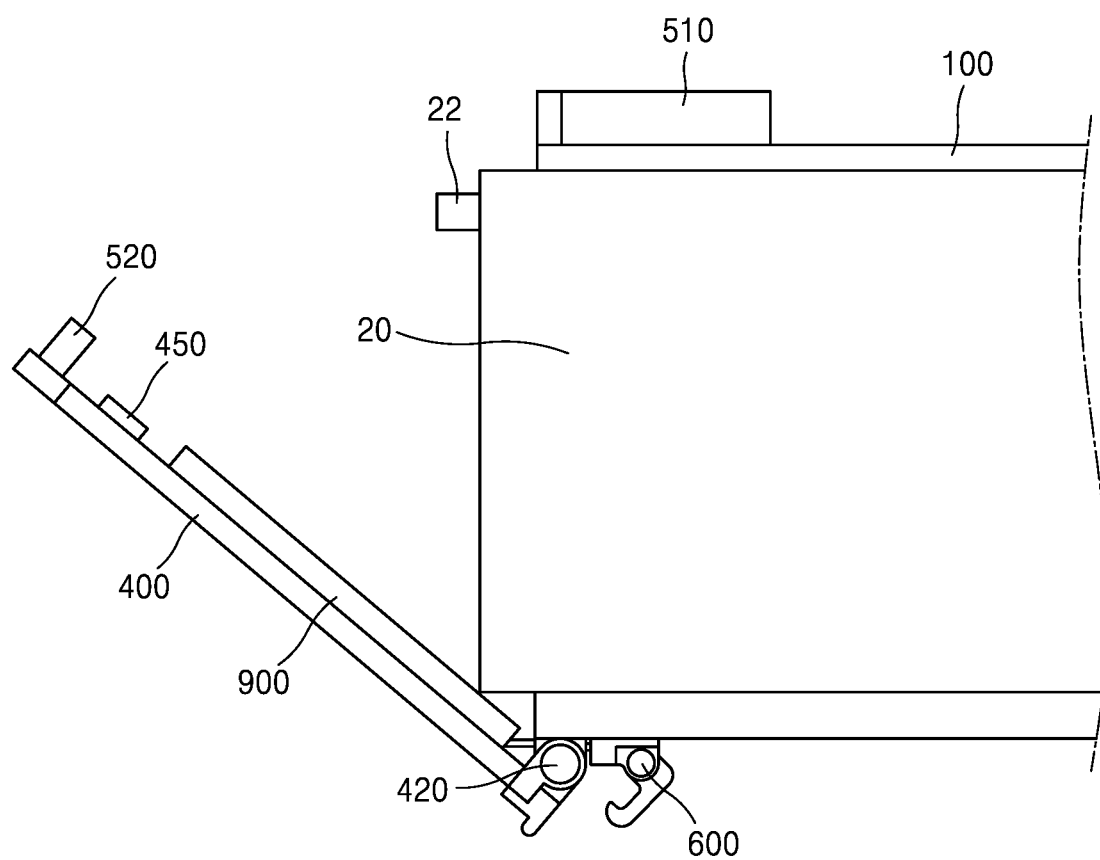

FIGS. 12A and 12B are views schematically showing an opening/closing protection member of the cubesat deployer according to one embodiment of the present invention.

FIG. 12A is a perspective view schematically showing an opening/closing protection member 900 according to one embodiment of the present invention.

Referring to FIG. 12A, the opening/closing protection member 900 of the present invention is disposed at an inner side of the opening/closing unit 400 to prevent the cubesat 20, which is separated when the opening/closing unit 400 is opened, from colliding with the opening/closing unit 400.

FIG. 12B is a side view schematically showing a state in which the cubesat 20 is separated from the cubesat deployer 10 according to one embodiment of the present invention.

Referring to FIG. 12B, as for the opening/closing protection member 900, when the opening/closing motor 510 pushes the opening/closing fixing pin 520 to open the opening/closing unit 400, the cubesat 20 accommodated in the container unit 100 moves in the direction of the outlet of the container unit 100 by the force supplied by the spring unit 200 as the second cubesat coupling member 22 is separated from the second deployer coupling part 450 of the opening/closing unit 400.

In this case, since the opening/closing unit 400 rotates about the opening/closing hinge pin 420 so as to be opened, while the cubesat 20 moves in the direction of the outlet after the second deployer coupling part 450 is separated from the second cubesat coupling member 22, one side of the cubesat 20 may collide with the opening/closing unit 400. In order to prevent the collision, the opening/closing protection member 900 is provided at the inner side of the opening/closing unit 400, so that the cubesat 20 may be protected from the collision.

According to one embodiment of the present invention, when the cubesat 20 is moved in the direction of the outlet of the container unit 100 by the spring unit 200, the opening/closing protection member 900 makes contact with one side of the cubesat 20 to protect the cubesat 20 from an impact, and guides the cubesat 20 so that the cubesat 20 may move in the direction of the outlet.

Preferably, the opening/closing protection member 900 may be formed of a polyacetal resin. The polyacetal resin is a plastic material for aerospace that may substitute for a metal, and has a low coefficient of friction so as to be effective for impact reduction. As described above, the opening/closing protection member 900 is formed of the polyacetal resin so that the cubesat 20 may be prevented from colliding with the opening/closing unit 400 so as to be damaged when the cubesat 20 is separated from the cubesat deployer 10.

According to one embodiment of the present invention, the cubesat accommodated in the cubesat deployer is coupled to the cubesat deployer by a protrusion-groove type fixing device to prevent the cubesat from deviating by vibrations in the launch environment, so that malfunctions can be prevented from occurring.

According to one embodiment of the present invention, the satellite connection part of the cubesat deployer, which makes direct contact with the cubesat, is fixed to the container unit by the satellite connection part fixing member to prevent abnormal vibrations of the cubesat from occurring, so that the malfunctions can be prevented from occurring.

According to one embodiment of the present invention, the satellite connection part fixing member is manipulated through the satellite connection part adjustment member when the opening/closing unit is closed, so that the position at which the satellite connection part is fixed can be adjusted.

According to one embodiment of the present invention, the satellite guidance member guides the cubesat accommodated in the cubesat deployer in the direction of the outlet, so that the cubesat is prevented from being damaged when the cubesat is separated.

According to one embodiment of the present invention, communication is made through the communication connection unit while the cubesat is accommodated in the cubesat deployer, so that the operation state of the cubesat can be inspected while the cubesat is assembled to the launch vehicle.

According to one embodiment of the present invention, when the opening/closing unit is opened to allow the cubesat to be separated, the opening/closing unit fixing unit can prevent the opening/closing unit from being closed again so as to collide with the cubesat, so that the cubesat can be prevented from being damaged.

According to one embodiment of the present invention, when the opening/closing unit is opened to allow the cubesat to be separated, the opening/closing protection member can prevent the cubesat from colliding with the opening/closing unit and being damaged.

Although the above embodiments have been described with reference to the limited embodiments and drawings, it will be understood by those skilled in the art that various changes and modifications may be made from the above-mentioned description. For example, even if the described techniques are performed in an order different from the described method, and/or the described components such as a system, a structure, a device, and a circuit are coupled or combined in a form different from the described method, or replaced or substituted by other components or equivalents, appropriate results may be achieved. Therefore, other implementations, other embodiments, and equivalents to the claims are also within the scope of the following claims.

What is claimed is:

1. A cubesat deployer comprising:
    a container unit configured to accommodate a cubesat to protect the cubesat;
    an opening/closing unit configured to open or close an outlet of the container unit, wherein the cubesat is configured to enter or exit through the outlet of the container unit;
    a spring unit configured to apply a force to the cubesat to push the cubesat to separate the cubesat from the container unit,
    wherein the spring unit comprises first deployer coupling parts configured to couple with first cubesat coupling members provided on a first surface of the cubesat, and the first deployer coupling parts are configured to fix the cubesat while the cubesat is accommodated in the cubesat deployer, and
    wherein the opening/closing unit comprises second deployer coupling parts configured to couple with second cubesat coupling members provided on a second surface of the cubesat, and the second deployer coupling parts are configured to fix the cubesat while the cubesat is accommodated in the cubesat deployer, the second surface of the cubesat is positioned opposite to the first surface of the cubesat; and
    a fixing unit configured to fix the opening/closing unit to open after the opening/closing unit is opened,
    wherein the fixing unit comprises:
        a latching sill, which is fixed below a hinge pin of the opening/closing unit;
        a latching hook pin, which is fixed below a bottom surface of the container unit; and
        a latching hook, which is fixed by the latching hook pin, and
    wherein the latching hook is configured to couple with the latching sill to fix the opening/closing unit to open after the opening/closing unit is opened.

2. The cubesat deployer of claim 1, wherein the spring unit further includes:
    a satellite connection part making contact with the cubesat to transmit the force to the cubesat when the cubesat is separated;
    a main spring member for supplying the force to the satellite connection part when the cubesat is separated; and
    a satellite connection part fixing member coupled to the satellite connection part to adjust positions of the satellite connection part and the container unit when the cubesat is accommodated in the cubesat deployer.

3. The cubesat deployer of claim 1, wherein the container unit is formed with a satellite connection part adjustment member in a form of a through-hole to allow a user to manipulate the satellite connection part fixing member to adjust the positions at which the satellite connection part and the container unit are fixed when the opening/closing unit is closed.

4. The cubesat deployer of claim 1, further comprising a satellite guidance member disposed at an inner side of the container unit to guide the cubesat to move in a direction of the outlet.

5. The cubesat deployer of claim 4, wherein the satellite guidance member has a shape of a guide rail to guide the cubesat by making line contact with the cubesat.

6. The cubesat deployer of claim 1, further comprising an opening/closing protection member disposed at an inner side of the opening/closing unit to prevent the cubesat, which is separated when the opening/closing unit is opened, from colliding with the opening/closing unit.

7. The cubesat deployer of claim 6, wherein the opening/closing protection member is formed of a polyacetal resin.

* * * * *